US011812835B2

(12) United States Patent
Kovarik (10) Patent No.: US 11,812,835 B2
(45) Date of Patent: *Nov. 14, 2023

(54) WEARABLE INSECT REPELLENT DEVICE AND METHOD

(71) Applicant: Seed Health Inc., Venice, CA (US)

(72) Inventor: Joseph E. Kovarik, Englewood, CO (US)

(73) Assignee: Seed Health, Inc., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,052

(22) Filed: Apr. 9, 2022

(65) Prior Publication Data

US 2022/0225746 A1    Jul. 21, 2022

Related U.S. Application Data

(63) Continuation-in-part of application No. 17/676,736, filed on Feb. 21, 2022, now Pat. No. 17,676,736, which is a continuation of application No. 16/557,415, filed on Aug. 30, 2019, now Pat. No. 11,253,042, which is a continuation of application No. 14/611,458, filed on Feb. 2, 2015, now Pat. No. 10,398,209, which is a continuation of application No. 14/502,097, filed on Sep. 30, 2014, now Pat. No. 9,010,340, which is a continuation of application No.
(Continued)

(51) Int. Cl.
  *A01N 25/08* (2006.01)
  *A45D 29/00* (2006.01)
  *A45D 29/17* (2006.01)

(52) U.S. Cl.
  CPC ........... *A45D 29/007* (2013.01); *A01N 25/08* (2013.01); *A45D 29/00* (2013.01); *A45D 29/17* (2013.01); *A45D 2200/1018* (2013.01); *A45D 2200/1036* (2013.01)

(58) Field of Classification Search
  None
  See application file for complete search history.

(56) References Cited

U.S. PATENT DOCUMENTS

| 3,014,579 A | 12/1961 | Lathrop |
| 3,124,825 A | 3/1964 | Iovenko |

(Continued)

FOREIGN PATENT DOCUMENTS

| EP | 0356028 A1 | 2/1990 |
| EP | 0385534 | 9/1990 |

(Continued)

OTHER PUBLICATIONS

"Magis™ Foil Nail Wraps—Products," Magis Supplies Ltd., 2013, [retrieved on Dec. 30, 2013], 2 pages. Retrieved from: www.foilnailwraps.com/products.

(Continued)

*Primary Examiner* — Nicole P Babson
(74) *Attorney, Agent, or Firm* — Sheridan Ross P.C.

(57) ABSTRACT

A wearable insect repellent device (such as a wrist/ankle band or adhesive strip) includes an encapsulated insect repellent adjacent to an absorbent material, which is itself adjacent to an odor impervious material, and where at least about 0.5 ml of insect repellent is encapsulated in a frangible enclosure that when fractured, releases a fresh supply of repellent onto said absorbent material for the passive evaporation of the repellent.

18 Claims, 3 Drawing Sheets

Related U.S. Application Data

14/307,651, filed on Sep. 18, 2014, now Pat. No. 8,936,030, which is a continuation-in-part of application No. 14/079,054, filed on Nov. 13, 2013, now Pat. No. 8,757,173, which is a continuation of application No. 13/425,913, filed on Mar. 21, 2012, now Pat. No. 8,584,685.

(60) Provisional application No. 61/467,767, filed on Mar. 25, 2011.

(56) References Cited

U.S. PATENT DOCUMENTS

| | | |
|---|---|---|
| 3,341,466 A | 9/1967 | Brynko et al. |
| 3,369,553 A | 2/1968 | Keesee |
| 3,516,941 A | 6/1970 | Matson |
| 3,577,515 A | 5/1971 | Vandegaer |
| 3,598,685 A | 8/1971 | Lee et al. |
| 3,645,835 A | 2/1972 | Hodgson |
| 3,729,569 A | 4/1973 | Charle et al. |
| 3,759,259 A | 9/1973 | Truhan |
| 4,619,253 A | 10/1986 | Anhauser et al. |
| 4,696,393 A | 9/1987 | Laipply |
| 4,740,194 A | 4/1988 | Barabino et al. |
| 4,800,904 A | 1/1989 | Kinseley et al. |
| 4,844,885 A | 7/1989 | Chernack |
| 4,938,347 A | 7/1990 | Tillman |
| 5,026,541 A | 6/1991 | Lanier |
| 5,066,419 A | 11/1991 | Walley et al. |
| 5,071,704 A | 12/1991 | Fischel-Ghodsian |
| 5,100,028 A | 3/1992 | Seifert |
| 5,154,842 A | 10/1992 | Walley et al. |
| 5,320,217 A | 6/1994 | Lenarz |
| 5,415,903 A | 5/1995 | Hoffman et al. |
| 5,455,043 A | 10/1995 | Fischel-Ghodsian |
| 5,525,389 A | 6/1996 | Hoffman et al. |
| 5,558,700 A | 9/1996 | Shibahashi et al. |
| 5,591,820 A | 1/1997 | Kydonieus et al. |
| 5,656,282 A | 8/1997 | Cook et al. |
| 5,823,203 A | 10/1998 | Carroll et al. |
| 5,924,428 A | 7/1999 | Song |
| 6,016,915 A | 1/2000 | Almond |
| 6,020,066 A | 2/2000 | Weisser et al. |
| 6,060,073 A | 5/2000 | Keller |
| 6,162,454 A | 12/2000 | Ahr |
| 6,305,383 B1 | 10/2001 | Thoma |
| 6,367,485 B1 | 4/2002 | Dutton-Davis et al. |
| 6,394,040 B1 | 5/2002 | Axel |
| 6,405,735 B1 | 6/2002 | Dockery |
| 6,481,443 B1 | 11/2002 | Moore-Johnson et al. |
| 6,534,079 B1 | 3/2003 | Munagavalasa |
| 6,582,714 B1 | 6/2003 | Emmrich et al. |
| 6,586,529 B2 | 7/2003 | Mumick et al. |
| 6,634,367 B2 | 10/2003 | Abraham et al. |
| 6,662,807 B2 | 12/2003 | Meinschewnk |
| 6,865,444 B2 | 3/2005 | Howard |
| 6,901,935 B2 | 6/2005 | Chang |
| 6,988,502 B2 | 1/2006 | Tsukamoto |
| 6,990,985 B1 | 1/2006 | Allen et al. |
| 7,008,392 B2 | 3/2006 | Beaudry |
| 7,025,521 B2 | 4/2006 | Tsaur |
| 7,806,877 B2 | 10/2010 | Kang et al. |
| 7,833,492 B2 | 11/2010 | Schumacher et al. |
| 7,980,203 B1 | 7/2011 | Rubottom et al. |
| 8,513,322 B2 | 8/2013 | Wright et al. |
| 8,534,947 B2 | 9/2013 | Prax |
| 8,584,685 B2 | 11/2013 | Kovarik et al. |
| 8,602,261 B2 | 12/2013 | Koele et al. |
| 8,696,227 B1 | 4/2014 | Carter |
| 8,748,477 B2 | 6/2014 | Scialdone |
| 8,757,173 B2 | 6/2014 | Kovarik et al. |
| 8,879,898 B2 | 11/2014 | Neumann |
| 8,936,030 B2 | 1/2015 | Kovarik et al. |
| 9,010,340 B2 | 4/2015 | Kovarik et al. |
| 10,398,209 B2 | 9/2019 | Kovarik |
| 11,253,042 B2 | 2/2022 | Kovarik |
| 2002/0160035 A1 | 10/2002 | Fotinos |
| 2003/0125222 A1 | 7/2003 | Jahns et al. |
| 2003/0127104 A1 | 7/2003 | Tyre |
| 2003/0152483 A1 | 8/2003 | Munagavalasa |
| 2004/0134999 A1 | 7/2004 | Aiyama |
| 2004/0142830 A1 | 7/2004 | Tavares |
| 2005/0284777 A1 | 12/2005 | Wilkman |
| 2006/0188538 A1 | 8/2006 | Emmrich et al. |
| 2006/0226249 A1 | 10/2006 | Ketcha et al. |
| 2006/0283470 A1 | 12/2006 | Keogh |
| 2007/0107745 A1 | 5/2007 | Kiyomoto |
| 2007/0287647 A1 | 12/2007 | Hadry |
| 2008/0039812 A1 | 2/2008 | Kang |
| 2008/0041404 A1 | 2/2008 | Vo |
| 2008/0060550 A1 | 3/2008 | MacDonald |
| 2008/0142405 A1 | 6/2008 | Knapp |
| 2010/0083974 A1 | 4/2010 | Milican |
| 2010/0175942 A1 | 7/2010 | Griep et al. |
| 2010/0204076 A1 | 8/2010 | Cheng |
| 2010/0255741 A1 | 10/2010 | Tee |
| 2010/0275942 A1 | 11/2010 | Barile |
| 2010/0305491 A1 | 12/2010 | Bschnagel |
| 2011/0152159 A1 | 6/2011 | Labeque |
| 2011/0284017 A1 | 11/2011 | Nakamura |
| 2012/0148636 A1 | 6/2012 | Berrido et al. |
| 2012/0264788 A1 | 10/2012 | Ecker et al. |
| 2012/0305019 A1 | 12/2012 | Barile |
| 2013/0074859 A1 | 3/2013 | Horvath et al. |
| 2013/0095162 A1 | 4/2013 | Quinn |
| 2013/0247841 A1 | 9/2013 | Stoffels et al. |
| 2013/0251773 A1 | 9/2013 | Galiatsatos et al. |
| 2014/0007894 A1 | 2/2014 | Gagnon |
| 2015/0013709 A1 | 1/2015 | Scheurn et al. |

FOREIGN PATENT DOCUMENTS

| | | |
|---|---|---|
| FR | 3011442 A1 | 4/2015 |
| GB | 751600 | 6/1956 |
| GB | 2289220 A | 11/1995 |
| KR | 20030077867 | 10/2003 |
| WO | WO 03/101606 | 12/2003 |

OTHER PUBLICATIONS

Official Action for U.S. Appl. No. 13/425,913 dated Feb. 15, 2013, 11 pages.

Notice of Allowance for U.S. Appl. No. 13/425,913 dated Sep. 16, 2013, 14 pages.

Notice of Allowance for U.S. Appl. No. 14/079,054 dated Feb. 7, 2014, 9 pages.

Notice of Allowance for U.S. Appl. No. 14/307,651 dated Sep. 23, 2014, 8 pages.

Notice of Allowance for U.S. Appl. No. 14/502,097, dated Feb. 18, 2015, 8 pages.

English translation of KR 20030077867 A, accessed Jun. 16, 2017.

Proniuk S1, Liederer BM, Dixon SE, Rein JA, Kallen MA, Blanchard J. "Topical formulation studies with Deet (N, N-diethyl-3-methybenzamid) and cyclodextrins" J Pharm Sci, Jan. 2002: 91(1): 101-10.

"Deet" National Center for Biotechnology Information. Pub Chem Compound Database: CID=4284, https://pubchem.ncbi.nlm.nih.gov/compound/ 4284 (accessed Jun. 26, 2017).

WEARABLE INSECT REPELLENT DEVICE AND METHOD

RELATED APPLICATIONS

This application is a continuation-in-part of U.S. patent application Ser. No. 17/676,736, filed Feb. 21, 2022, which is a continuation of U.S. patent application Ser. No. 16/557,415, filed Aug. 30, 2019 (now U.S. Pat. No. 11,253,042, issued Feb. 22, 2022), which is a continuation of U.S. patent application Ser. No. 14/611,458, filed Feb. 2, 2015 (now U.S. Pat. No. 10,398,209, issued Sep. 3, 2019), which is a continuation of U.S. patent application Ser. No. 14/502,097 filed on Sep. 30, 2014 (now U.S. Pat. No. 9,010,340, issued Apr. 21, 2015), which is a continuation of U.S. patent application Ser. No. 14/307,651 filed on Jun. 18, 2014 (now U.S. Pat. No. 8,936,030, issuing Jan. 20, 2015), which is a continuation-in-part of U.S. patent application Ser. No. 14/079,054 filed on Nov. 13, 2013 (now U.S. Pat. No. 8,757,173, issuing Jun. 24, 2014), which is a continuation of U.S. patent application Ser. No. 13/425,913 filed on Mar. 21, 2012 (now U.S. Pat. No. 8,584,685, issued Nov. 19, 2013), which claims priority from U.S. Provisional Patent Application No. 61/467,767 filed on Mar. 25, 2011. The entire disclosure of the prior applications are considered to be part of the disclosure of the accompanying application and are hereby incorporated by reference.

FIELD OF THE INVENTION

The present invention relates to a wearable insect repellent device (such as a wrist/ankle band or adhesive strip) that includes, in one embodiment, an encapsulated insect repellent adjacent to an absorbent material, which is itself adjacent to an odor impervious material, and where at least about 0.5 ml of insect repellent is encapsulated in a frangible enclosure that when fractured, releases a fresh supply of repellent onto said absorbent material for the passive evaporation of the repellent.

BACKGROUND OF THE INVENTION

There are thousands of mosquito species, and different species can carry different diseases, including malaria, yellow fever, West Nile Virus, and now the Zika virus. In places where these diseases easily spread, humans can be at risk of dying from a mosquito bite. For example, according The World Health Organization, about 3.2 billion people—nearly half of the world's population—are at risk of malaria. Current studies have shown that a child dies from malaria at a rate of almost one per minute.

Mosquitoes, flies, gnats, fleas and ticks are a common problem. Conventional applications of insect repellents currently available to the consumer are inadequate, presenting several inefficiencies and hazards. Sprays and lotions can be toxic, irritate the skin, harm fabric and other materials, and leave a greasy, unpleasant coating. Sprays and lotions are absorbed into the skin, directly exposing the wearer to the same chemicals intended to protect them from insects, possibly resulting in allergic or other physical reactions. Additionally, sprays fill the atmosphere with chemicals and may be inhaled or get into the users eyes, on food, or other unintended places. Clip-on fan insect repellent devices are bulky, limited to where they may be attached or worn, and are relatively complex and expensive, requiring the purchase of repellent inserts and batteries at an additional cost. Clip-on fans may not be used indoors or in enclosed places, and do not work well if the wearer is moving.

Hematophagous arthropods are capable of transmitting human and animal pathogens worldwide. Vector-borne diseases account for 17% of all infectious diseases resulting in 700,000 human deaths annually. Repellents are a primary tool for reducing the impact of biting arthropods on humans and animals. N,N-Diethyl-meta-toluamide (DEET), the most effective and long-lasting repellent currently available commercially, has long been considered the gold standard in insect repellents.

It is believed that DEET repels mosquitos by blocking a female mosquito's antennal sensory receptors for volatile and organic molecules. Regardless of how it may actually work, from a pragmatic perspective, DEET has proven to be one of the most effective single compounds available to repel mosquitos. But to be effective, DEET (as well as lesser effective repellents) depend on the rate of repellent evaporation to achieve maximum and prolonged protection. One convenient way of delivering insect repellent currently available is through bands, for personal wear around wrists, ankles and necks. Such bands are stored in a sealed bags to attempt to prevent evaporation before use, but once unsealed, the effectiveness of such bands is time limited. Some existing wrist bands infused with repellent are in direct contact with the wearer's skin. Still others require a user to recharge the insect repellent by adding repellent from outside the confines of the band. Many commercially available bands are typically simply soaked, by immersion, in liquid DEET—which then evaporates progressively.

There is a need for products that are effective at controlling, killing, removing and/or repelling insects, for example blood-sucking insects, such as mosquitoes, ticks, fleas, lice, bed bugs, tsetse flies and other nuisance insects. There is a long felt but unsolved need for devices that can protect subjects from insects in a manner that does not involve the harmful and often dangerous aspects of using prior art devices that permit undesired insect repellant substances to contact one's skin. There is also a need for an insect repellant device that permits a user to adjust the amount of insect repellant desired at any given time, in sufficiently concentrated form, and in a simple and straightforward manner without the disadvantages of prior art insect repellant bands, wraps, sprays and lotions.

SUMMARY OF THE INVENTION

Known methods for delivering insect repellents in a manner which is safe and efficacious tend to be dangerous, short-acting and inconvenient. One method by which consumers protect themselves from insect bites and insect landings is the use of topical repellents. Many topical repellents contain N,N-diethyl-m-toluamide ("DEET") as the active ingredient. Topical repellents contain relatively high amounts of insect repellent that can be absorbed into the bloodstream through the skin. Therefore, it is an object of this invention to provide a method and device for repelling insects by providing a more convenient, cost effective, user-friendly and effective devices and methods for repelling insects as compared to the use of topical repellents in lotion or spray-on form.

One particular aspect of the present invention is directed to the field of insect repellents and specifically to personal area repellents. Thus, insect repellent substances are encapsulated in a frangible shell such that release of such material upon the selection of the user and in a fashion that can prevent substantial skin contact with the insect repellent, is made possible. In certain embodiments, the present invention is directed to an adhesive patch or strip that can be contacted to a person's body and that has an insect repellent capsule associated with the absorbent material that has (and preferably is surrounded by) adhesive material designed to contact a wearer's skin. In one embodiment, a band-aid-like product is provided that has a capsule having insect repellent encapsulated in a reservoir wherein the encapsulation is within a frangible enclosure that is in contact with an absorbent material, such that when the capsule is broken, the insect repellent material soaks the absorbent material and thus permits the repellent to emanate its vapors, and thus protection, from the site where the band-aid has been attached. Preferably a skin barrier, preferably odor impermeable, is provided such that the insect repellent material does not contact the person's skin, but rather the barrier supports the layer of encapsulated insect repellent such that when the frangible encapsulation is broken, the material soaks absorbent material on top of the barrier, and the insect repellent can then vaporize into the air surrounding the strip.

DEET (N,N-diethyl-m-toluamide) is a versatile and effective insect repellent that has been used for more than 40 years by millions of people worldwide to repel mosquitoes, ticks, fleas, biting flies and chiggers. Most bug repellents contain DEET because DEET is one of the few insect repellents that work. It is recommended to prevent mosquito-born diseases such as malaria, dengue fever, and West Nile virus. Persons applying DEET to their skin may get hives or have mild redness and irritation. These symptoms are usually mild and will go away when the product is removed from the skin. Persons who use very high concentrations of DEET on their skin over a long period of time (such as military personnel or game wardens) may have more severe skin reactions that include blistering, burning, and permanent scars of the skin. Other symptoms associated with long-term use of high amounts of DEET (over 50% concentration) include insomnia and mood changes. By far, the most serious and devastating complication of large DEET poisonings is neurological damage. Patients may have disorientation, clumsiness when walking, seizures, or coma. Death is possible in these cases. Users of DEET are warned to not apply it over cuts, wounds or irritated skin; to avoid spraying DEET on plastics (such as watch crystals and eyeglasses frames), rayon, spandex, other synthetic fabrics, leather and painted or varnished surfaces, because DEET can damage those surfaces. While typically effective, DEET products must be reapplied after several hours. Due to the problems it can present to humans, despite its effectiveness as a repellent, DEET is typically employed at rather low concentrations, with a concentration of 10% to 30% used according to the directions on the product labels.

Among the drawbacks of DEET are that it possesses an unpleasant odor and imparts a greasy feel to the skin. Although it has recently been re-registered for use in the US by the EPA, concerns have been raised as to its safety, particularly when applied to children. Studies have demonstrated that high concentrations of DEET may give rise to allergic or toxic reactions in some individuals. Other disadvantages associated with DEET include that it (1) is a synthetic chemical having a limited spectrum of activity; (2) is a powerful plasticizer and will dissolve or mar many plastics and painted surfaces; and (3) plasticizes the inert ingredients typically used in topical formulations in order to lengthen the time of effectiveness. This leads to DEET formulations with low user acceptability. Clinical observations have shown that DEET insect repellent can cause severe central nervous system toxicity and even death from skin penetration. This is a particularly significant problem for children who have larger body surface area-to-mass ratios and higher skin permeability. Additionally, children tend to lick their fingers and hands, which can cause them to ingest the insect repellents. Because insect repellents are removed by skin absorption, evaporation, perspiration, and through participation in water activities, it must be reapplied at frequent intervals. The requirement for frequent reapplications results in a continual threat of systemic toxicity to the user. Indeed, the theoretical risks associated with wearing an insect repellent should be weighed against the reduction or prevention of the risk of fatal or debilitating diseases including malaria, dengue, yellow fever and filariasis. With millions travelling to regions where vector borne diseases are a threat, restricting the concentration of DEET containing repellents to 15% or less, would likely result in extensive sub-therapeutic activity where repellents are infrequently applied.

The present invention provides a way to safely and effectively achieve insect repellent results without applying the active compound directly to the skin. In various embodiments dealing with the encapsulation of an insect repellent, the wearer of the adhesive device or strip preferably avoids having their skin directly contacted with a topical repellent material, but at the same time, benefits from having the repellent very close to the skin of the wearer, thus achieving the benefits of having the vapors that repel insects, while not experiencing the topical absorption of insect repellent that is believed to be less than desirable from a health standpoint. Thus, in some embodiments, there is provided a barrier (e.g. a foil or plastic film or layer, preferably odor impermeable) between the absorbent layer and the skin of a person such that the encapsulated insect repellent, once the insect repellent capsule is broken and soaks the absorbent material, does not contact the skin of the wearer of the adhesive strip. Instead, the breakage of the frangible enclosure of insect repellent causes the absorbent material to become somewhat saturated in a manner that permits the insect repellent to relatively slowly evaporate and cause protective vapors to surround the skin of the wearer of the strip, thus providing insect repellent protection without the user experiencing any of the potentially harmful effects derived from a topical application of the insect repellent materials. Deet can therefore be used in high enough and effective concentrations such that it achieves its purpose of repelling insects while at the same time, not harming the subject wearing the device of the present invention. In addition to DEET, other repellents can be used, or in combination with other less effective repellents that contain pyrethrins, a pesticide created from the chrysanthemum flower; neem leaf extract, neem oil, citronella and/or geraniol. In certain embodiments of the present invention, dihydronepetalactone compositions are employed in the encapsulated structures described herein in addition to or in place of DEET compositions, as such dihydronepetalactone compositions perform well without the disadvantageous properties characteristic of prior-art compositions.

Personal insect repellents, such as DEET-containing lotions and sprays, are commonly applied directly to the skin of a user and are recognized as efficacious when so used. Some users, however, find such a treatment to be aesthetically unsatisfactory. There exist treated wrist bands, patches and other treated materials to be worn or otherwise applied to a user's skin or clothing to repel mosquitoes, many employing citronella as a repellent, such as in U.S. Pat. No. 5,656,282, (incorporated herein by this reference), which teaches the use of patches attachable to clothing or limbs that disperse citronella. Use of transfluthrin, vaporthrin, and/or DDVP to control insects via passive evaporation is known in the context of room insect control. See e.g. U.S. Pat. Nos. 6,582,714; and 6,534,079, also incorporated herein in their entireties by this reference. Similarly, publication 2004/0134999 (incorporated herein by this reference) teaches the use of metofluthrin or profluthrin to passively evaporate and control insects for room control. But none of these prior art devices have the attributes of the present invention in its various embodiments, including avoiding the dangerous aspects of using prior art devices that permit undesired insect repellant substances to contact one's skin, as well as permitting a user to adjust the amount of insect repellant desired at any given time, in sufficiently concentrated form, and in a simple and straightforward manner without the disadvantages of prior art insect repellant bands, wraps, sprays and lotions.

In particular embodiments, insect repellents that may be encapsulated and then employed on the strips or bands of the present invention include the following: a dihydronepetalactone, or a mixture of dihydronepetalactone stereoisomers, an aliphatic alcohol; a component selected from the group consisting of (i) one or more members of the group consisting of (AI) cyclo(ethoxy) methicone, (BI) bisphenyl hexamethicone, (CI) $C_{24}$~$C_{28}$ alkyl methicone, and (DI) cetyl dimethicone polyol; (ii) one or more members of the group consisting of (AII) glycol ricinoleate, (BII) polyglyceryl ricinoleate, (CII) propylene glycol ricinoleate, and (DII) glyceryl ricinoleate; and (iii) octyldodecanol; a component (d) that comprises a $C_{50}$~$C_{650}$ branched polyhydroxy polyoxyethylene/polyoxypropylene block copolymer of ethylene diamine; a component (e) that comprises (i) a mixture of butylene glycol, propylene glycol and methyl propanediol, and/or (ii) a mixture of glycerol, methyl propanediol and isostearyl neopentanoate; and a component (f) that comprises one or more members of the group consisting of aminobenzoic acid, glyceryl aminobenzoic acid, oxybenzone, sulisobenzone, dioxybenzone and titanium dioxide.

In addition to DEET or in its place, various embodiments of compositions that may be encapsulated and used on strips or bands of the present invention include picaridin, with 5%-15% picaridin formulas being found comparable in effectiveness (2-6 hours) to low-concentration DEET; and natural repellents made from plants, e.g. coconut oils, oil of lemon eucalyptus, citronella, and soybean/geranium oils.

In preferred embodiments, the strip or band of various embodiments includes absorbent material suitable to restrain the insect repellent once released from a frangible enclosure, such as a substrate formed from a material selected from the group consisting of polypropylene, polyethylene, polyester, nylon, rayon, cellulose acetate, wood pulp and cotton, and other non-woven fabrics which may be spunbonded, spunlaced, spunlaid, melt blown, needle punched, hydroentangled, latex bonded, and/or resin bonded.

The insect repellent strips and bands may be placed at a variety of locations, such as around wrists or ankles, near the shoulders or chest, along the calves or lower limbs, or on clothing adjacent to these positions.

In one embodiment, the insect repellent strip/band is comprised of a multi-layer structure, with an upper impregnatable non-woven fiber material layer adjacent to one or more encapsulated structures containing the insect repellent, an adhesive layer, and a peel-off layer. Preferably, there is a barrier between the insect repellent encapsulated material and the skin of a user, such that no undesired contact with insect relent transpires. In other words, a person achieves protection from insects without exposing themselves to having insect repellent contact their skin directly, but instead, are able to apply adhesive strips that both protect the skin from insect repellent while also providing the advantages attained by having insect repellent on top of the particular skin surface.

The strips/bands of the present invention are of a type that can be readily and inexpensively manufactured. Further, they are of a size and weight that a consumer would tolerate wearing. When the insect (preferably mosquito) repellent strips are used, after the release of the encapsulated repellent into the adjacent absorbent material, one achieves the vapors that are believed responsible for the mosquito-repelling effect. The mosquito strips can also be applied to walls, furniture, tents, and household appliances and can provide good mosquito-repelling effect.

Thus, in one embodiment, the insect repellent strip includes a pre-sized strip for adhesive engagement with a person's skin or clothing, such strip having an adhesive portion that is configured to contact the skin or clothing to hold such strip in place, where the strip has at least three or four layers, with a first layer comprising an exterior odor impervious material, a second layer that comprises one of encapsulated insect repellent, a third layer having an insect repellent absorbent layer, and a fourth layer (for adhesive embodiments) having a peelable backing; and wherein the insect repellent is encapsulated in a frangible shell.

Two of the most important problems regarding insect repellents include the following: i) each mosquito species has differing biting time, host, and habitat preferences and ii) many mosquito species present different sensitivity for each repellent. As such, embodiments of the present invention include frangible capsules that are filled with distinct repellents that are effective against different types or species of insects.

The figures provide schematic drawings showing strips/bands 10 applied to an object or a person's body so as to achieve protection via the deployment of insect repellent by the purposeful breakage of encapsulated capsules 11 on an absorbent pad 12.

Embodiments of the present disclosure may provide wearables that protect humans from mosquito bites. While this disclosure often refers to repelling mosquitoes, it should be appreciated that embodiments of the present invention may be used to protect against attacks by other insects, including, but not limited to, ticks, ants, flies, chiggers, bed bugs and midges (no-see-ums).

One will appreciate that this summary of the Invention is not intended to be all encompassing and that the scope of the invention nor its various embodiments, let alone the most important ones, are necessarily encompassed by the above description. One of skill in the art will appreciate that the entire disclosure, as well as the incorporated references, pictures, etc. will provide a basis for the scope of the present invention as it may be claimed now and in future applications.

DETAILED DESCRIPTION OF CERTAIN PREFERRED EMBODIMENTS

Figure 1:
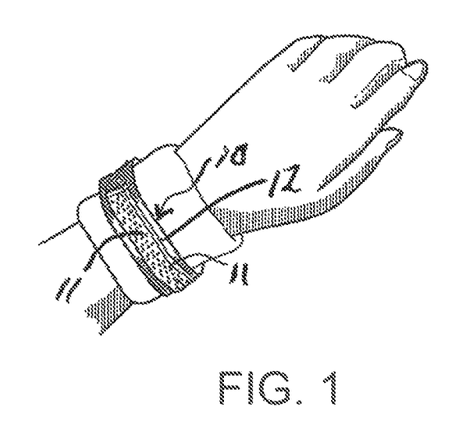
FIG. 1 is a schematic drawing showing the wrist and hand portion of a person wearing a wristband with a strip according to the present invention.
Figure 2:
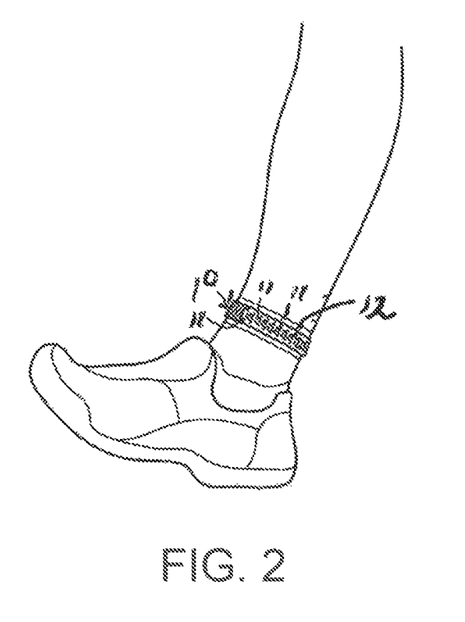
FIG. 2 is a schematic drawing showing the lower leg and foot portion of a person wearing an ankle band with a strip according to the present invention.
Figure 3:
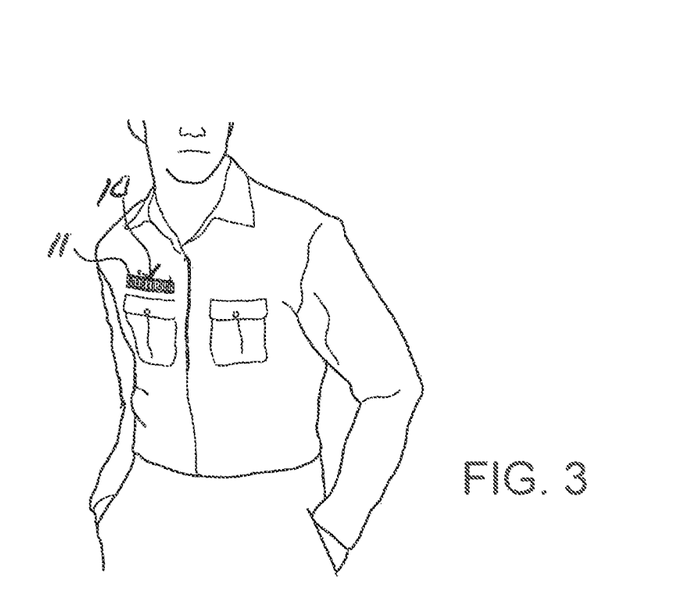
FIG. 3 is a schematic drawing showing the upper body portion of a person wearing a shirt with a repellent pocket strip according to the present invention.
Figure 4:
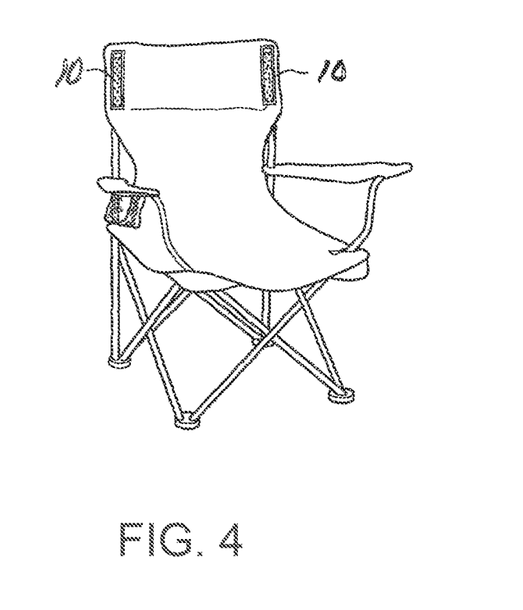
FIG. 4 is a schematic drawing showing a chair with strips according to the present invention.
Figure 5:
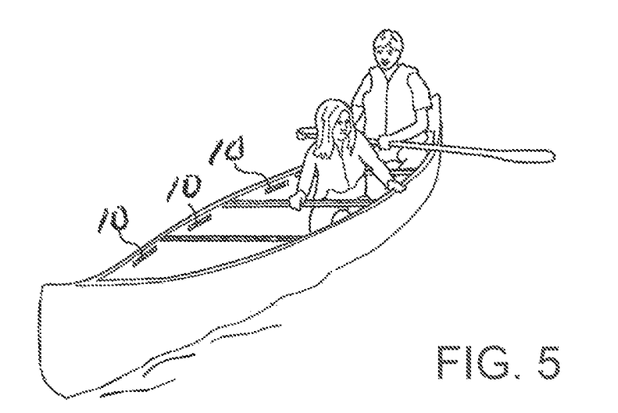
FIG. 5 is a schematic drawing showing a canoe with strips attached according to the present invention.
Figure 6:
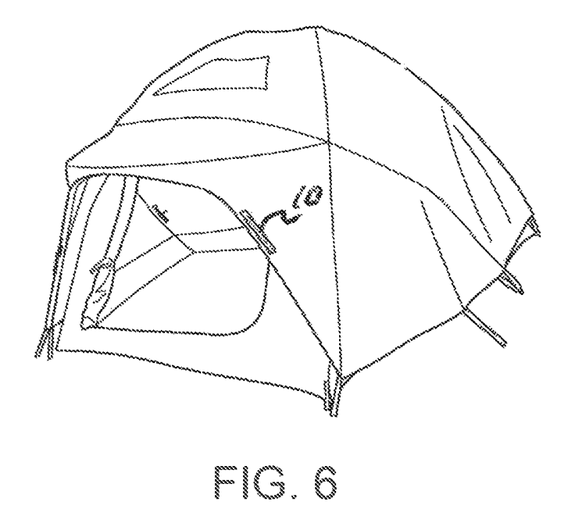
FIG. 6 is a schematic drawing showing a tent with strips attached according to the present invention.

It is an object of certain embodiments of the present invention to provide a wearable personal protection device that can be worn on a person and that rely on passive evaporation of the insect repellent out of a carrier impregnated therewith. Repellents may include DEET, geraniol, citronella, limonene, and pyrethroids such as allethrin, as well as other repellents described herein.

Certain advantages of use of the present invention include the ability of a user to apply a strip/band to areas of their body desired to be protected at some time and the later deployment of the insect repellent via the purposeful breakage of at least one of the encapsulated capsules present on a strip so as to achieve the maximum protection with freshly provided repellent. The manner in which the frangible capsule can be broken, e.g. with either a finger compressing the capsule sufficiently hard downwardly against the skin surface upon which the strip is adhered to; by employment of a non-body part, such as a pencil or other hard object by which to achieve the compressive force necessary to break the capsule and thus release the insect repellent into the absorbent material of the strip, etc., can vary. Importantly, however, it is possible for a user of the strip to avoid any hand contact, and certainly at least any substantial hand contact, with the insect repellent whatsoever, but still achieve employment of the freshly activated and available insect repellent by breaking one or more frangible encapsulated enclosures of the insect repellent. Thus, the dosage (e.g. via breaking one, two, three or more frangible encapsulations of insect repellent); and the timing of administration/employment of insect repellent, is provided as an available option for a user. In certain situations such options that avoid the necessity of having to use one's hands to physically contact insect repellent lotions or creams to rub over parts of one's body to achieve insect repellent protection is critical, such as when an outdoorsman is involved in other activities that do not readily permit the rubbing of lotions on body parts. Thus, a white water rafter, a mountain rope climber, a hunter, etc. by using the present invention, are able to simply cause one or more frangible encapsulations to break that are pre-positioned on the person's wrist, arm, ankles, thighs, etc., when actively engaged in other sporting/paddling/hunting activities where having to either spray a can of insect repellent or rub lotion on body parts would be not only inconvenient, but perhaps dangerous.

In certain other aspects of the present invention, embodiments include the use of encapsulated substances in addition to insect repellent that one may wish to employ at either the same time or at different times for different purposes. For example, different dosages or concentrations of an insect repellent may be desired at different times of day. A lighter dose of certain repellents may be desired in the morning when certain insects may not be a problem, but a heavier dose or a completely different formulation of repellent, may be desired at a different time of day when certain insects may be more active. The wearer of a strip may also desire to have a certain perfume aspect available to mask the smell and odor of certain repellents, and thus, the breaking of one or more encapsulations that contain a perfume or cyclodetrin component to mask or eliminate certain odors is made possible by the present invention. Strips can be made that include different sized encapsulations (e.g. volumetric amounts) such that not only the type of substance can be selected to be released from such frangible enclosures, but the user may select the volume of such substance to release at any time.

To further comply with written description and enablement requirements, incorporated by reference in their entireties are the following US patents and publications: 20130095162 to Quinn, U.S. Pat. No. 5,591,820 to Bastar; U.S. Pat. No. 6,865,444 to Howard; 20020160035 to Fotinos; U.S. Pat. No. 5,455,043 to Fischel-Ghodsian; 20060188538 to Emmrich et al.; U.S. Pat. No. 8,748,477 to Scialdone; 20120264788 to Ecker et al.; and 20020160035 to Kim.

In a particular embodiments, the frangible encapsulated enclosures of repellent material (although there can be other agents so encapsulated) may be present in a volume that exceeds some of the other embodiments described above with respect to the preferably 0.5 ml and 1 ml amounts. Thus, volumes of 2 ml, 4 ml, 10 ml or greater may be achieved to suit the particular application and need.

Various embodiments will also employ a color change agent to display to the person wearing such strip/band that the frangible capsule has been broken. Still other color change agents may be used to indicate the length of time that the device has been employed, for example, how long the repellent has been broken out of (freed) from its frangible shell, such that a person can decide to either replace the strip/band or to break another of the unbroken frangible encapsulations on the strip/band. A series of frangible encapsulations can thus be provided on any strip/band such that the dose, type or frequency of administration of an agent encapsulated thereby can be released. Certain strips/bands may have different sized and different volume of encapsulations on the same strip/band to permit a selection of dosage; type of repellent employed at a given time, etc. Thus, in one example, a strip/band may have a DEET encapsulated frangible shell as well as a non-DEET insect repellent, such the user (or pat owner) may select which particular agent to employ at any given time.

Another aspect of the present invention is directed to the encapsulation of bioluminescent material in a manner such that the frangible capsule(s) can be active to trigger bioluminescent illumination upon fracturing of the frangible shell, thus releasing the material into preferably the absorbent material. As one will appreciate, however, in other embodiments the bioluminescent material may be simply constrained in another enclosure after the underlying frangible capsule is broken (thus triggering the activation of the bioluminescent material, such that the bioluminescent material will slosh around yet another enclosure on the strip, but without the use of any absorbent material).

One particular use of the strip embodiments that contain a bioluminescent capsule, is that a pet owner can choose to break both a capsule filled with an insect repellent, as well as break a capsule on the same strip that contains bioluminescent material, thus providing the pet with protection from some insects, and at the same time being visible at night for a certain period of time (e.g. until the bioluminescent material expires is illumination abilities.) Certain other embodiments include just the provision of a strip with one or more frangible capsules of bioluminescent material that a pet owner, a parent of a child going treat or treating on Halloween, etc. can selectively determine what illumination is desired via the breakage of more than one capsule provided on the strip. Different colored bioluminescent material may be provided on individual strips/bands, or may be provided in individual capsules containing such different materials on a single strip/band, thus permitting some individual selection of what colors of bioluminescent materials to display at any given time. Either bioluminescent, photo luminescent, fluorescent, chemiluninescent or phosphorescent materials, or a combination thereof, can be employed as useful in the present invention, as each of such substances can be encapsulated in a manner that when the frangible encapsulation is broken, the illuminating aspects of the material enclosed in the frangible shell can luminescence. For written description and enablement support for various embodiments, the following are incorporated herein by this reference in their entireties: U.S. Pat. No. 7,980,203 to Rubottom; 20130247841 to Stoffels, et al.; and U.S. Pat. No. 6,394,040 to Axel.

In certain embodiments, the encapsulated, frangible enclosures resemble in some respects so-called blister-packaging, with desired material within such "blisters" that contain, in addition to insect repellents, preferably DEET, other substances and compositions selected from the group of acetone, solvents, chemiluminescent material, glow-in-the-dark material, perfumes, deodorants, masking agents, color change agents, hunting scents that conceal a hunter's natural body odor from a hunted animal. One of skill in the art will appreciate, however, that still numerous other compounds, substances, chemicals, etc. of various uses can be included in various embodiments of the present invention, especially those that require desired temporal release of material into an absorbent material so that such material either remains in contact with a desired surface for predetermined amounts of time, or alternatively, is permitted to evaporate or vaporize into the surrounding atmosphere so as to distribute the desired agent for the purpose at hand. For example, with respect to blister-type packages, the blisters can be pressed on to cause a fracture thereof, thus releasing the enclosed material into absorbent material, another less frangible enclosure, etc.

Desired material to encapsulate, such as perfumes, insect repellents, solvents, etc. are often expensive and generally less cost-effective when employed at high levels in personal care compositions, cleaning compositions, and protective chemical agents for humans or pets. As a result, there is a desire to maximize the effectiveness of such desired materials. One method of achieving such an objective is to improve the delivery efficiency and active lifetime of the desired material. This can be achieved by providing the desired material as a component of a small capsule or a microcapsule. Capsules provide several benefits. They have the benefit of protecting the desired material from physical or chemical reactions with incompatible ingredients in the composition, volatilization or evaporation. Capsules have the further advantage in that they can deliver the desired material to the substrate and can be designed to rupture under desired conditions. Capsules are made either by supporting the desired material on a water-insoluble porous carrier or by encapsulating the desired material in a water-insoluble shell. For example, in the latter category microencapsulates are made by precipitation and deposition of polymers at the interface, such as in coacervates, for example as disclosed in US Patent publication 20110152159; GB-A-0 751 600, U.S. Pat. No. 3,341,466 and EP-A-0 385 534, or other polymerisation routes such as interfacial condensation U.S. Pat. No. 3,577,515, US-A-2003/0125222, U.S. Pat. No. 6,020,066, WO2003/101606, U.S. Pat. No. 5,066,419. A particularly useful means of encapsulation is using the melamine/urea-formaldehyde condensation reaction as described in U.S. Pat. Nos. 3,516,941, 5,066,419 and 5,154,842, all of the above references which are incorporated herein in their entireties by this reference. Such capsules are made by first emulsifying a desired material in small droplets in a pre-condensate medium obtained by the reaction of melamine/urea and formaldehyde and then allowing the polymerisation reaction to proceed along with precipitation at the oil-water interface. The encapsulates range in size from a few micrometers to several millimeters and can be obtained in a suspension form in an aqueous medium. The microcapsules preferably comprise a nominal shell to core mass ratio lower than 15%, preferably lower than 10% and most preferably lower than 5%. Hence, the microcapsules may have extremely thin and frangible shells. The compositions of the present invention may be encapsulated within a water-soluble film. The water-soluble film may be made from polyvinyl alcohol or other suitable variations, carboxy methyl cellulose, cellulose derivatives, starch, modified starch, sugars, PEG, waxes, or combinations thereof. In another embodiment the water-soluble film may include a co-polymer of vinyl alcohol and a carboxylic acid. The water-soluble film herein may also comprise ingredients other than the polymer or polymer material. For example, it may be beneficial to add plasticisers, for example glycerol, ethylene glycol, diethyleneglycol, propane diol, 2-methyl-1,3-propane diol, sorbitol and mixtures thereof, additional water, disintegrating aids, fillers, anti-foaming agents, emulsifying/dispersing agents, and/or antiblocking agents.

In one embodiment where two materials are to be released (such as an insect repellent and a color change agent or a bioluminescent material), a divider may be employed that may comprise a membrane having one or more zones of weakness, such as a declivity or score line, such that when the hollow body is bent, pressed, crushed, flexed, or compressed along the zone of weakness, an opening is created in the divider, permitting the contents of the first compartment and the second compartment to mix. In other embodiments, one or more puncture tips may be provided along an inner surface of the hollow body retaining the solvent, color change agent, etc. When a compressive, bending or flexing force is applied against the puncture tips, the tips puncturely engage the divider and form an opening therein, permitting the contents to saturate the absorbent material. The hollow body that holds the solvent, insect repellent, color change agent, etc. is preferably manufactured from a gas and liquid impermeable, heat sealable material that is suitable for thermal bonding or sonic welding. This material is preferably flexible—or at least crushable via manual compression, so that the user will be able to manually manipulate the contents of the compartments. An exemplary material is commercially available Mylar-polyethylene barrier layer material. Other suitable materials include high-density polyethylene, polypropylene, polystyrene, polyvinylchloride, and the like. Suitable materials for making liquid impermeable film include polyolefins, such as polyethylene and polypropylene; polyvinyl acetate; and the like. The absorbent material and the solvent containing reservoir may be joined to the by such means as adhesives, ultrasonic welding, heat bonding, and the like.

The hollow body preferably has an opening at a first end, and a frangible seal that closes the opening to retain the contents housed in the hollow body. In one embodiment, the frangible seal comprises a thin membrane, for example, thin films of plastic or aluminum foil can be heat sealed to the hollow body to cover the opening in the first end. Upon bending the walls of the hollow body at or near the frangible seal, the seal is broken. In another embodiment, the frangible seal comprises a cover having a zone of weakness, such as one or more score lines so that when a compression force is applied near the cover, the score lines are broken, permitting fluid to pass therethrough. Other exemplary frangible seals are disclosed in Truhan, U.S. Pat. No. 3,759,259 and U.S. Patent Publication No. 20120148636 to Berrido et al.—which are incorporated herein by this reference.

An absorbent material preferably is of a known type, including but not limited to cotton fibers or synthetic fibers, such as plastic fibers, or a semi-porous material, such as a sponge, preferably ones that are acetone resistant. When the frangible seal is broken, the contents of the hollow body are released into the absorbent material. Suitable substrate materials for the nail contacting portion of the strip have been described herein, but may include woven fabrics, non-woven fabrics, gauze, foams, sponges and the like.

The hollow interior of the solvent containing member defines a reservoir for containing a liquid composition, such as the solvent, insect repellent, color change material, etc. and at least its proximal and distal ends are sealed to provide a liquid tight seal. Preferably, a frangible seal is provided at distal end that is liquid-tight prior to use of the strip. The frangible seal is designed to preferably be weaker than the seal at its proximal end, thus when the solvent containing capsule is manipulated, for example by squeezing with the fingers causing the frangible seal to be broken, permitting the solvent or other liquid material in the reservoir can flow out. The plastic at the distal end of the stick may be first thinned out and then sealed to provide frangible seal. Suitable designs for material employing a hollow reservoir for use in the present invention are known in the art and are taught, for example, in U.S. Pat. No. 5,100,028, the disclosure of which is hereby incorporated by reference, albeit that the reservoirs are preferably smaller to enclose them in the absorbent material of the strip. The reservoir material be made of any suitable material including, but not limited to, plastics such as polyethylene, polypropylene, foil, and the like. The size of the liquid reservoir is sufficient to retain enough liquid for accomplishing the desired function of nail polish removal, gel removal, shellac remover, etc. Still other patents that are incorporated herein by this reference are U.S. Pat. No. 7,008,392 to Beaudry; U.S. Pat. No. 8,696,227 to Carter; U.S. Pat. No. 4,740,194 to Barabino; and U.S. Pat. No. 7,025,521 to Tsaur, showing how various embodiments can be made.

Thus, for example, a band-aid-like structure can be used in association with a capsule containing aloe or another wound healing substance, or a pain killer, an allergesic, a medicine, a growth promoting material, a cosmetic, a lotion, a muscle treatment gel, bug repellent, deodorant, antiperspirant, etc. such that the affected area can be covered with an adhesive bandage and then at a desired time, the capsule associated with e absorbent material can be broken to release the desired pre-packaged substance or combination of substances. In one particular embodiment, the use of a capsule is employed that can contain more than one substance separated by frangible structures such that a combination of substances can be delivered in a desired sequence and in a particular position on a surface, such as a person's skin, so that the purposeful combination of such substances can be achieved in an easy fashion. The strips of the present invention, by virtue of their encapsulated frangible structures associated with absorbent materials and barriers (either to retain solvent material from vaporizing into the air freely, or conversely, a barrier on the opposite side of the absorbent material such that the material in the encapsulated structure is precluded from contacting an underlying surface and is instead, free to vaporize) find various uses that are accomplished in an easy, cost effective manner and enables one to carry the devices with them for use outside of professional salons, medical clinics, etc.

In preferred embodiments, DEET (or other insect repellants are not contained in any paper or woven substrate, but rather are encapsulated in a fashion that they are held separate and above absorbent material that are only soaked with the contents of broken capsules upon the rupture thereof. Moreover, in preferred embodiments, DEET is not contained in microcapsules, but rather in far more macro capsules such that a person can rupture enclosures of repellant by simply pressing on discreet "bubbles" (similar to bubble wrap structures) to release desired amounts of repellents.

In other embodiments, various other insect repellents may be employed, either alone or in combination with others. For example, in certain embodiments, insect repellents that contain coconut compositions that have been found to be very effective insect repellents. Coconut derived fatty acids repelled biting flies, bed bugs, ticks and mosquitoes, having residual activities comparable to that of DEET. It is well-known that insect bites can cause local or systemic effects that lead to infectious or inflammatory responses in human and animals.

Moreover, many blood-sucking insects (primarily in mosquitoes) transmit many pathogens primarily plasmodium (malaria), viruses causing West Nile, Zika, yellow fever, and dengue in humans, in addition to equine infectious anemia, and African swine fever in animals. Biting flies, such as stable flies (*Stomoxys calcitrans*) and horn flies (*Haematobia irritans*), have been reported to not only reduce the productivity of livestock, and also to transmit Lumpy Skin Disease and Rift Valley viruses mechanically. Furthermore, another two blood-sucking arthropods often found in urban environments, ticks and bed bugs, have recently experienced resurgences for which ticks are vectors of many human and animal pathogens.

Coconut oil is a highly saturated triglyceride oil known for its rich lauric ($C_{12:0}$) and myristic acid ($C_{14:0}$) content. This oil, extracted from the kernel or meat of mature coconuts (*Cocos nucifera*), exhibits high repellency against stable flies that cause over 2 billion dollars in losses to the US livestock industry. Higher repellent efficacy is possible using mixtures of medium chain length acids rather than individual fatty acids due to a synergistic effect in repellency.

Various compositions can be employed as insect repellents and thus, encapsulated together or separately (e.g. to provide choices for individuals as to type of substance they wish to employ via breaking frangible encapsulations; dosage and timing of administration of an insect repellent). Thus, one aspect of the invention involves the provision of an insect repellent strip (which should be understood in various embodiments to comprise a patch—rather than any rectangular-limited shaped product) having one or more encapsulated insect repellent containing formulations that when released onto an absorbent material—(i.e. after the encapsulated structure is broken)—a person is provided with an amount of insect repellent in a selectively desirable time period and in a desired amount. Thus, certain embodiments include more than one frangible encapsulated portion of an insect repellent, such as DEET, so that if one desires a higher concentration and/or increased volume of material, or on a more frequent administration regime, to be made available to the absorbent material of a strip as described herein, they can selectively compress and break such enclosed capsules to release desired and pre-determined amounts of the insect repellent for the particular occasion. For example, if someone is trekking through a mosquito infested area for several hours and requires reapplication of a DEET containing formulation to achieve desired protection, but also desires to avoid skin contact with DEET products, then the ability to simply break one of several DEET containing capsules at a desired time period, thus permitting the DEET material to soak the adjacent absorbent material, and then provide the protection due to the vapors evolving from the now soaked absorbent material, is an effective way to achieve insect repellent results without undue skin exposure to DEET. The strips or patches may be stick-on patches, or may be in the form of wrist, ankle, arm or leg bands, or may be in the form of pendants or medallions. The insect repellent strips of the present invention are suitable to dispense at least 0.01 mg of insect repellent per hour at 25.degree.C. in still air conditions. In certain embodiments, the insect repellent encapsulated within the one or more capsules (which preferably each contain at least about 0.25 ml of an insect repellent composition), includes a pyrethroid insect repellent selected from the group consisting of transfluthrin, metofluthrin, and profluthrin. The total amount of said insect repellent so applied is an amount effective to provide practical mosquitoe personal area repellency. Preferably, an insect repellent is provided in at least 0.5 ml encapsulated enclosures that are designed to be frangible upon a person compressing such structures to cause the release of the contents thereof, preferably being then absorbed onto the adjacent absorbent material. To comply with written description and enablement requirements, incorporated by reference in their entireties are the following: U.S. patent Publications and patents: 20130095162 to Quinn, U.S. Pat. No. 5,591,820 to Bastar; U.S. Pat. No. 6,865,444 to Howard; 2002-0160035 to Fotinos; U.S. Pat. No. 5,455,043 to Fischel-Ghodsian; 20060188538 to Emmrich et. al.; U.S. Pat. No. 8,748,477 to Scialdone; and 2002 0160035 to Kim; and US Patent publication No. 20060226249 to Ketcha, et al.

The insect repellent strips and bands of the present invention are advantageous over topical compositions for several reasons, including that they are more convenient in that they do not require the time consuming task of applying lotion or a spray to clothing and exposed skin. The wearable strips and bands offer similar advantages to those of topical compositions without the drawbacks, as they provide protection wherever the subject goes, as would a topical composition when applied correctly. For ease of complying with written description and enablement requirements, the following references are incorporated herein in their entireties, especially as it relates the various acetone-based and non-acetone based compounds and solutions and formulations that can be employed in various embodiments of the present invention: U.S. Pat. No. 5,823,203 to Carroll et al., U.S. Pat. No. 6,367,485 to Dutton-Davis et al.; 20030127104 to Tyre; 20060283470 to Keogh; 20070107745 to Kiyomoto; 20070287647 to Hadry; 20080142405 to Knapp; 20100204076 to CHENG; 20100305491 to Baschnagel; 20080060550 to MacDonald; U.S. Pat. No. 7,806,877 to Kang et al.; U.S. Pat. No. 4,800,904 to Kinseley et al.; U.S. Pat. No. 4,619,253 to Anhauser et al.; U.S. Pat. No. 5,924,428 to Song; U.S. Pat. No. 6,990,985 to Allen et al.; U.S. Pat. No. 6,060,073 to Keller; and U.S. Pat. Nos. 5,415,903 and 5,525,389 to Hoffman et al. Also incorporated by reference herein in their entireties are the following issued patents and published applications: 20040142830 to Tavares; 20080039812 to Kang; U.S. Pat. No. 4,696,393 to Laipply.

As designed, a device and method embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A wearable insect repellent device, comprising an insect repellent layered strip having three layers, with a first layer comprising an odor impervious material, a second layer that comprises at least one encapsulated solvent comprising N,N-diethyl-m-toluamide (DEET), and a third layer having a solvent absorbent material in the form of a pad, wherein the solvent is encapsulated in a frangible enclosure and is present in an amount of at least about 0.5 ml, and wherein the breakage of the frangible enclosure releases a fresh supply of said solvent onto said pad for the passive evaporation of said solvent.

2. The insect repellent layered strip as set forth in claim 1, wherein said solvent includes a color change indicator.

3. The insect repellent layered strip as set forth in claim 1, wherein said frangible enclosure is attached to the solvent absorbent material.

4. The insect repellent layered strip as set forth in claim 1, wherein the frangible enclosure comprises polytetrafluoroethylene.

5. The insect repellant layered strip set forth in claim 1, further comprising an additional encapsulated solvent is selected from the group consisting of coconut oil and myristic acid.

6. The insect repellent layered strip as set forth in claim 1, further including at least one of an odor reducer and a color change agent.

7. The insect repellent layered strip as set forth in claim 1, wherein said solvent absorbent material comprises nonwoven fabrics.

8. The insect repellent layered strip as set forth in claim 1, wherein the frangible enclosure has a hollow interior that defines a reservoir for containing in addition to said solvent, a color change material, and an odor reducing agent comprising hydroxypropyl beta-cyclodextrin.

9. The insect repellent layered strip as set forth in claim 1, wherein said frangible enclosure comprises a capsule that contains more than one substance.

10. The insect repellent layered strip as set forth in claim 1, wherein said first layer forms a barrier between the solvent and the skin of a user.

11. The insect repellent layered strip as set forth in claim 1, further comprising an odor reducing agent comprising hydroxypropyl beta-cyclodextrin.

12. The insect repellent layered strip as set forth in claim 1, wherein the insect repellant layered strip has the second layer and the third layer adjacent to each other.

13. An insect repellent layered strip, consisting of: a first layer that comprises an odor impervious material, a second layer that comprises an encapsulated solvent comprising N,N-diethyl-m-toluamide, a third layer in the form of a pad having a solvent absorbent material comprising non-woven material; wherein the encapsulated solvent is contained within a frangible enclosure comprised of polytetrafluoroethylene and wherein said first layer forms a barrier between the solvent and the skin of a user, and wherein the breakage of the frangible enclosure releases a fresh supply of said solvent onto said pad for the passive evaporation of said solvent.

14. The insect repellant layered strip as set forth in claim 1, further comprising an additional encapsulated solvent is selected from the group consisting of coconut oil, lauric acid and myristic acid.

15. The insect repellent layered strip as set forth in claim 1, further including a color change agent.

16. The insect repellent layered strip as set forth in claim 1, wherein said solvent absorbent material comprises non-woven material.

17. The insect repellent layered strip as set forth in claim 1, wherein the frangible enclosure has a hollow interior that defines a reservoir for containing in addition to said solvent, a color change material, a bioluminescent material, and an odor reducing agent comprising hydroxypropyl beta-cyclodextrin.

18. An insect repellent layered strip, consisting of: a first layer comprising an odor impervious material, a second layer that comprises an encapsulated solvent comprising N,N-diethyl-m-toluamide (DEET) and coconut oil that includes lauric acid and myristic acid, a third layer in the form of a pad having a solvent absorbent material comprising non-woven fabrics, wherein the solvent is encapsulated in a frangible enclosure comprising polytetrafluoroethylene, said solvent being present in an amount of at least about 0.5 ml, said frangible enclosure attached to the solvent absorbent material, wherein the frangible enclosure has a hollow interior that defines a reservoir for containing, in addition to said solvent, an odor reducing agent comprising hydroxypropyl beta-cyclodextrin, wherein said solvent absorbent material retains the DEET by soaking the solvent absorbent material, thereby providing insect repellent protection due to vapors evolving from the soaked solvent absorbent material, the solvent permitted to directly evaporate from the soaked solvent absorbent material into a surrounding atmosphere of the air surrounding said strip, and wherein breakage of the frangible enclosure releases a fresh supply of said solvent onto said pad for the passive evaporation of said solvent.

* * * * *